US012003169B2

(12) United States Patent
Horton et al.

(10) Patent No.: US 12,003,169 B2
(45) Date of Patent: Jun. 4, 2024

(54) CHAIN-LINK MODULES FOR VOLTAGE SOURCE CONVERTERS

(71) Applicant: General Electric Technology GmbH, Baden (CH)

(72) Inventors: Patrick Horton, Stafford (GB); Colin Chamock Davidson, Stafford (GB); Adrian Keitley, Stafford (GB); Mikel Olalquiaga San Emeterio, Stafford (GB)

(73) Assignee: GE INFRASTRUCTURE TECHNOLOGY LLC, Greeville, SC (US)

( * ) Notice: Subject to any disclaimer, the term of this patent is extended or adjusted under 35 U.S.C. 154(b) by 0 days.

(21) Appl. No.: 18/061,932

(22) Filed: Dec. 5, 2022

(65) Prior Publication Data

US 2023/0188027 A1    Jun. 15, 2023

(30) Foreign Application Priority Data

Dec. 15, 2021    (EP) .................................. 21214733

(51) Int. Cl.
*H02M 7/483* (2007.01)
*H02M 1/00* (2006.01)
*H02M 7/25* (2006.01)

(52) U.S. Cl.
CPC ......... *H02M 1/007* (2021.05); *H02M 1/0006* (2021.05); *H02M 7/25* (2013.01); *H02M 7/4835* (2021.05)

(58) Field of Classification Search
CPC .. H02M 1/0006; H02M 7/483; H02M 7/4835; H02M 1/007; H02M 7/25
See application file for complete search history.

(56) References Cited

U.S. PATENT DOCUMENTS 8,730,695 B1    5/2014 Ludlam et al.
2019/0260226 A1    8/2019 Lu et al.
(Continued)

FOREIGN PATENT DOCUMENTS

EP    2549634 A1    1/2013
EP    2843822 A2    3/2015
EP    3813239 A1    4/2021

OTHER PUBLICATIONS

Extended European Search Report issued in EP Application No. 21214733.4 dated May 31, 2022, 8 pages.

*Primary Examiner* — Alex Torres-Rivera
(74) *Attorney, Agent, or Firm* — Eversheds Sutherland (US) LLP

(57) ABSTRACT

In the field of chain-link modules for voltage source converters, there is a need for an improved chain-link module. A chain-link module, for connection in series with other chain-link modules to form a chain-link converter selectively operable to provide a stepped variable voltage source within a voltage source converter, includes at least one pair of series-connected switching elements that are connected in parallel with a number of series-connected energy storage devices. Each energy storage device has an auxiliary power supply unit connected in parallel therewith to source energy therefrom for supply to an auxiliary chain-link module control circuit. The chain-link module also includes a modulation controller which is interconnected between each auxiliary power supply unit and the auxiliary chain-link module control circuit. The modulation controller is configured to modulate the proportion of energy supplied to the auxiliary chain-link module control circuit by each auxiliary power supply unit.

10 Claims, 2 Drawing Sheets

(56) References Cited

U.S. PATENT DOCUMENTS

2021/0234454 A1\* 7/2021 Ishii ........................ H02M 1/36
2021/0257915 A1\* 8/2021 Ishii ...................... H02M 1/096

\* cited by examiner

CHAIN-LINK MODULES FOR VOLTAGE SOURCE CONVERTERS

TECHNICAL FIELD

This invention relates to a chain-link module, for connection in series with other chain-link modules to form a chain-link converter selectively operable to provide a stepped variable voltage source within a voltage source converter, to such a voltage source converter, and to a method of controlling such a chain-link module.

BACKGROUND

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power is also transmitted directly from offshore wind parks to onshore AC power transmission networks.

The conversion between DC power and AC power is utilized where it is necessary to interconnect DC and AC networks. In any such power transmission network, converters (i.e. power converters) are required at each interface between AC and DC power to effect the required conversion from AC to DC or from DC to AC.

One type of power converter is a voltage source converter, although other types of power converter are also possible.

Such a voltage source converter includes first and second DC terminals between which extends at least one converter limb, and typically three converter limbs each of which corresponds to a given phase of a three-phase electrical power system.

The or each converter limb includes first and second limb portions which are separated by an AC terminal.

In use the first and second DC terminals are connected to a DC network, and the or each AC terminal is connected to a corresponding phase of an AC network.

Each limb portion includes a chain-link converter which extends between the associated AC terminal and a corresponding one of the first or the second DC terminal. Each chain-link converter includes a plurality of series connected chain-link modules, while each chain-link module includes a number of switching elements which are connected in parallel with one or more energy storage devices, usually in the form of capacitors. Other types of energy storage device, i.e. any device that is capable of storing and releasing energy to selectively provide a voltage, e.g. a fuel cell or battery, may also be used however.

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at the or each AC terminal, and thereby enable the voltage source converter to provide the aforementioned power transfer functionality between the AC and DC networks.

SUMMARY

According to a first aspect of the invention there is provided a chain-link module, for connection in series with other chain-link modules to form a chain-link converter selectively operable to provide a stepped variable voltage source within a voltage source converter, the chain-link module comprising:

at least one pair of series-connected switching elements connected in parallel with a plurality of series-connected energy storage devices, each energy storage device having an auxiliary power supply unit connected in parallel therewith to source energy therefrom for supply to an auxiliary chain-link module control circuit; and a modulation controller interconnected between each auxiliary power supply unit and the auxiliary chain-link module control circuit, the modulation controller being configured to modulate the proportion of energy supplied to the auxiliary chain-link module control circuit by each auxiliary power supply unit.

A benefit of each energy storage device having an auxiliary power supply unit connected in parallel therewith allows each such auxiliary power supply unit to have a lower input voltage rating, e.g. compared to that it would need if connected in parallel with more than one energy storage device, thereby reducing the difficulties associated with designing the said auxiliary power supply unit.

In addition, the inclusion of a modulation controller configured to modulate the proportion of energy supplied to the auxiliary control circuit by each auxiliary power supply unit permits the energy stored by each energy storage device to be controlled. For example, if all energy storage devices are supplying energy to the auxiliary control circuit, but the energy stored by one energy storage device is considered too high, the modulation controller may temporarily interrupt the supply of energy by the or each other energy storage device, such that the remaining high-energy energy storage device supplies all of the energy needed by the auxiliary control circuit. The or each other energy storage device, being temporarily interrupted, supplies no such energy to the auxiliary control circuit, and thus the higher energy of remaining energy storage device is depleted, i.e. controlled, in preference to the energy of the or each other energy storage device.

Such control of the energy stored by a given energy storage device is highly desirable because it permits a balancing of the energies stored by the energy storage devices within each chain-link module which is, in turn, beneficial because it helps to achieve more efficient and reliable operation of the chain-link converters and voltage source converters of which such chain-link modules are a part. Moreover, in chain-link modules having a plurality of series-connected energy storage devices such energy balancing cannot always be achieved by operation of the switching elements in the chain-link modules, which would usually be the case.

Also, the energy removed from the energy storage device during such control of the energy stored is consumed usefully by the auxiliary control circuit, and so helps to minimise overall losses of any chain-link converter within which the chain-link module of the invention is deployed.

Preferably the modulation controller includes a respective energy conduit extending between each auxiliary power supply unit and the auxiliary chain-link module control circuit, and a selector module to determine which energy conduit supplies energy from the corresponding auxiliary power supply unit in preference to the or each other energy conduit.

Having such energy conduits within the modulation controller means that modulation of the proportion of energy supplied to the auxiliary control circuit can be performed separately from the auxiliary power supply units, i.e. without the need to interface or otherwise be arranged in operative control with any of the auxiliary power supply units. As a consequence, the risk of electromagnetic compatibility difficulties arising between the auxiliary power supply units and other parts of the chain-link module is much reduced.

In addition, the inclusion of a selector module to determine which energy conduit supplies energy from the corresponding auxiliary power supply unit in preference to the or each other energy conduit establishes a degree of control over the proportions of energy supplied by each of the auxiliary power supply units.

Preferably each energy conduit is selectively operable in an energy conducting configuration in which energy is able to flow therethrough and an energy blocking configuration in which energy is prevented from flowing therethrough.

Such selective operation of each energy conduit desirably facilitates the aforementioned preference determination by the selector module, i.e. desirably permits the selector module to throttle back, stop, maintain, or increase, as determined appropriate, the energy supplied by one energy conduit in preference to the or each other energy conduit.

Optionally each energy conduit is or includes an electrical conductor incorporating a series-connected electrical switch to switch the respective electrical conductor between energy conducting and energy blocking configurations.

Such an arrangement can be readily implemented in a simple, reliable and cost-effective manner.

The selector module may be configured to vary the proportion of energy supplied by each energy conduit.

The inclusion of such a selector module desirably permits the energy supplied by a given energy conduit to be increased (or decreased) in a proportional manner, or on some other basis, Such variable control, with suitable filtering, might alleviate some of the limitations due to interference and allow tighter energy balance control than might otherwise be possible using electrical switches alone.

In a preferred embodiment of the invention the selector module is configured to determine whether a respective energy conduit is to supply energy or not by comparing a measured energy storage value of the corresponding energy storage device with a reference energy storage value and arranging the respective energy conduit to supply energy if the measured energy storage value is greater than or equal to the reference energy storage value or to not supply energy if the measured energy storage value is less than the reference energy storage value.

Including a selector module configured to conduct such a comparison helps to ensure that each energy storage device stores only an amount of energy corresponding to the reference energy storage value, and thereby over time allows the energy stored by each energy storage device to move towards a balanced condition, i.e. to settle towards the same amount of energy being stored.

Optionally the selector module is configured to one or more of arrange the respective energy conduit to supply energy if the measured energy storage value exceeds the reference energy storage value by a predetermined amount and arrange the respective energy conduit to not supply energy if the measured energy storage value falls short of the reference energy storage value by a predetermined amount.

Such a selector module allows the amount of energy stored by each energy storage device to vary from one another by a predetermined amount, while still moving towards a generally balanced condition. This helps to avoid excessive switching of the energy conduits between energy conducting and energy blocking configurations, while still having the chain-link converter and voltage source converters within which the chain-link modules of the invention are utilised maintain an acceptable overall degree of efficiency and reliability.

Preferably the reference energy storage value is a measured energy storage value of another energy storage device.

Adopting such a reference energy storage value assists in having the energy stored by the or each other energy storage device move towards and become balanced with the energy stored by the energy storage device from which the measured energy storage value is taken.

In another preferred embodiment of the invention having first and second series-connected energy storage devices, the selector module is configured to determine whether a respective energy conduit is to supply energy or not if the difference between measured energy storage values of the first and second energy storage devices exceeds a predetermined threshold.

Such an arrangement helps to drive the energy stored by each of the first and second series-connected energy storage devices towards being balanced with one another.

Optionally the total energy stored by the plurality of energy storage devices combined is controlled independently of operation of the modulation controller.

Having independent control of the total energy stored by the plurality of energy storage devices in combination with one another within a given chain-link module is beneficial because, during operation of the chain-link module, e.g. within a chain-link converter of a voltage source converter, if the total energy to be stored is controlled to remain the same, the energy stored by the or each energy storage device having connected therewith an auxiliary power supply unit which is not supplying energy to the auxiliary control circuit will increase (since it will receive energy from the external power circuit of the said voltage source converter), while the energy stored by the or each energy storage device having connected therewith an auxiliary power supply unit which is supplying energy to the auxiliary control circuit will decrease.

According to a second aspect of the invention there is provided a voltage source converter comprising at least one chain-link converter having a plurality of series-connected chain-link modules, at least one of said chain-link modules being a chain-link module according to any preceding claim.

The voltage source converter of the invention shares the benefits of the corresponding features of the chain-link module of the invention.

According to a third aspect of the invention there is provided a method of controlling a chain-link module, for connection in series with other chain-link modules to form a chain-link converter selectively operable to provide a stepped variable voltage source within a voltage source converter, the chain-link module comprising at least one pair of series-connected switching elements connected in parallel with a plurality of series-connected energy storage devices, each energy storage device having an auxiliary power supply unit connected in parallel therewith to source energy therefrom for supply to an auxiliary chain-link module control circuit, the method comprising the step modulating the proportion of energy supplied to the auxiliary chain-link module control circuit by each auxiliary power supply unit.

The method of the invention shares the benefits of the corresponding features of the chain-link module of the invention.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
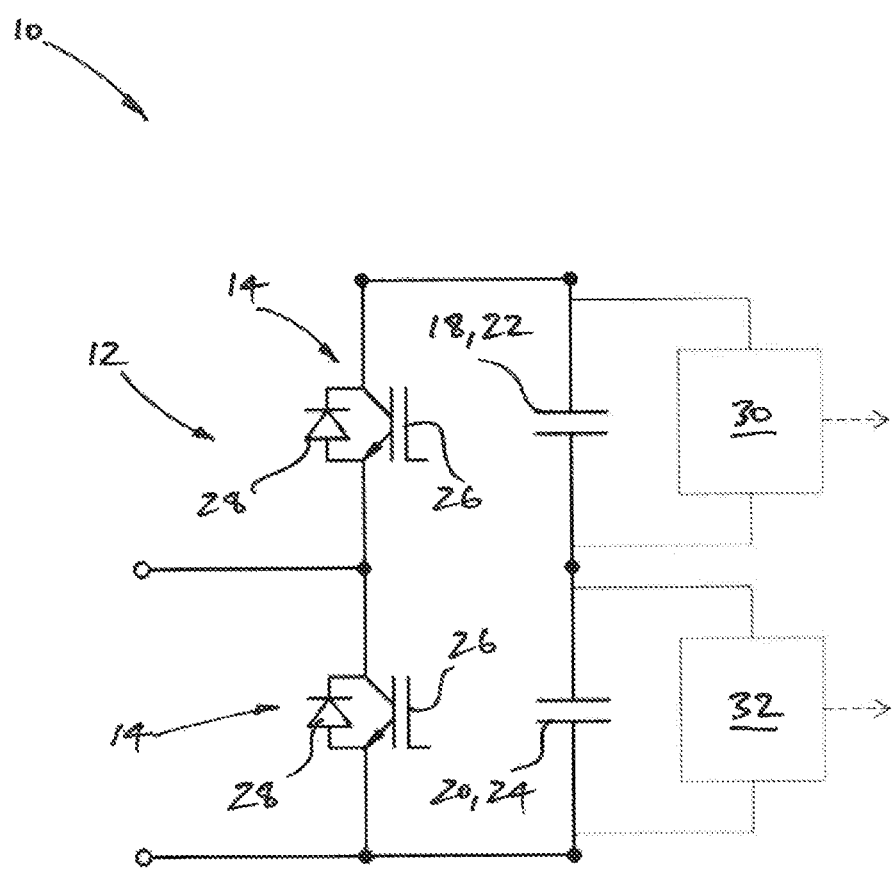
FIG. 1 shows a schematic view of a first part of a chain-link module according to a first embodiment of the invention.

A chain-link module according to a first embodiment of the invention is designated generally by reference numeral 10, as shown in FIG. 1.

The chain-link module 10 includes a first pair 12 of series-connected switching elements 14 that are connected in parallel with first and second series-connected energy storage devices 18, 20 in the form of respective first and second capacitors 22, 24, although other types of energy storage device may also be used. Furthermore, other embodiments of the invention (not shown) may include more than two series-connected energy storage devices.

Meanwhile returning to the embodiment shown, each switching element 14 includes a semiconductor device, in the form of an IGBT 26, which is connected in parallel with an anti-parallel diode 28. It is possible, however, to use one or more other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device instead of an IGBT. In addition, one or more of the semiconductor devices may instead include a wide-bandgap material such as, but not limited to, silicon carbide, boron nitride, gallium nitride and aluminium nitride.

The number of semiconductor devices in each switching element 14 may vary depending on the required voltage and current ratings of that switching element.

Alternative passive current check elements, i.e. alternatives to the anti-parallel diode 28, may also be included in other embodiments of the invention, e.g. any alternative element that is capable of limiting current flow in only one direction. The number of passive current check elements in each switching element 14 may vary too depending on the required voltage and current ratings of that switching element 14.

Returning to the first embodiment chain-link module 10 shown, the first pair 12 of switching elements 14 is connected in parallel with the first and second energy storage devices 18, 20, i.e. the first and second capacitors 22, 24, in a known half-bridge arrangement to define a 2-quadrant unipolar module. Switching of the switching elements 14 selectively directs current through the first and second capacitors 22, 24 or causes current to bypass the series-connected capacitors 22, 24, such that the first embodiment chain-link module 10 can provide zero or positive voltage and can conduct current in two directions.

Other embodiments of the invention (not shown) may additionally include a second pair of series-connected switching elements, separated by a second connection terminal, and which are connected in parallel with the first and second energy storage devices, i.e. the first and second capacitors. Such a second pair of switching elements by be so connected in a known full bridge arrangement to define a 4-quadrant bipolar module. In a similar manner to the first embodiment chain-link module 10 shown in FIG. 1, switching of the switching elements in such an arrangement again selectively directs current through the first and second capacitors or causes current to bypass the series-connected first and second capacitors, such that the 4-quadrant bipolar module of this type can provide zero, positive or negative voltage and can conduct current in two directions.

A chain-link converter (not shown) may include solely 2-quadrant unipolar modules in the form of the first embodiment chain-link module 10, solely 4-quadrant bipolar modules as described above, or a combination of both. In any event, such modules are connected in series so as to be selectively operable to provide a stepped variable voltage source within a voltage source converter.

Returning to the embodiment shown in FIG. 1, each energy storage device 18, 20 has an auxiliary power supply unit connected in parallel therewith, i.e. the first capacitor 22 has a first auxiliary power supply unit 30 connected in parallel therewith and the second capacitor 24 has a second auxiliary power supply unit 32 connected in parallel therewith.

Figure 2:
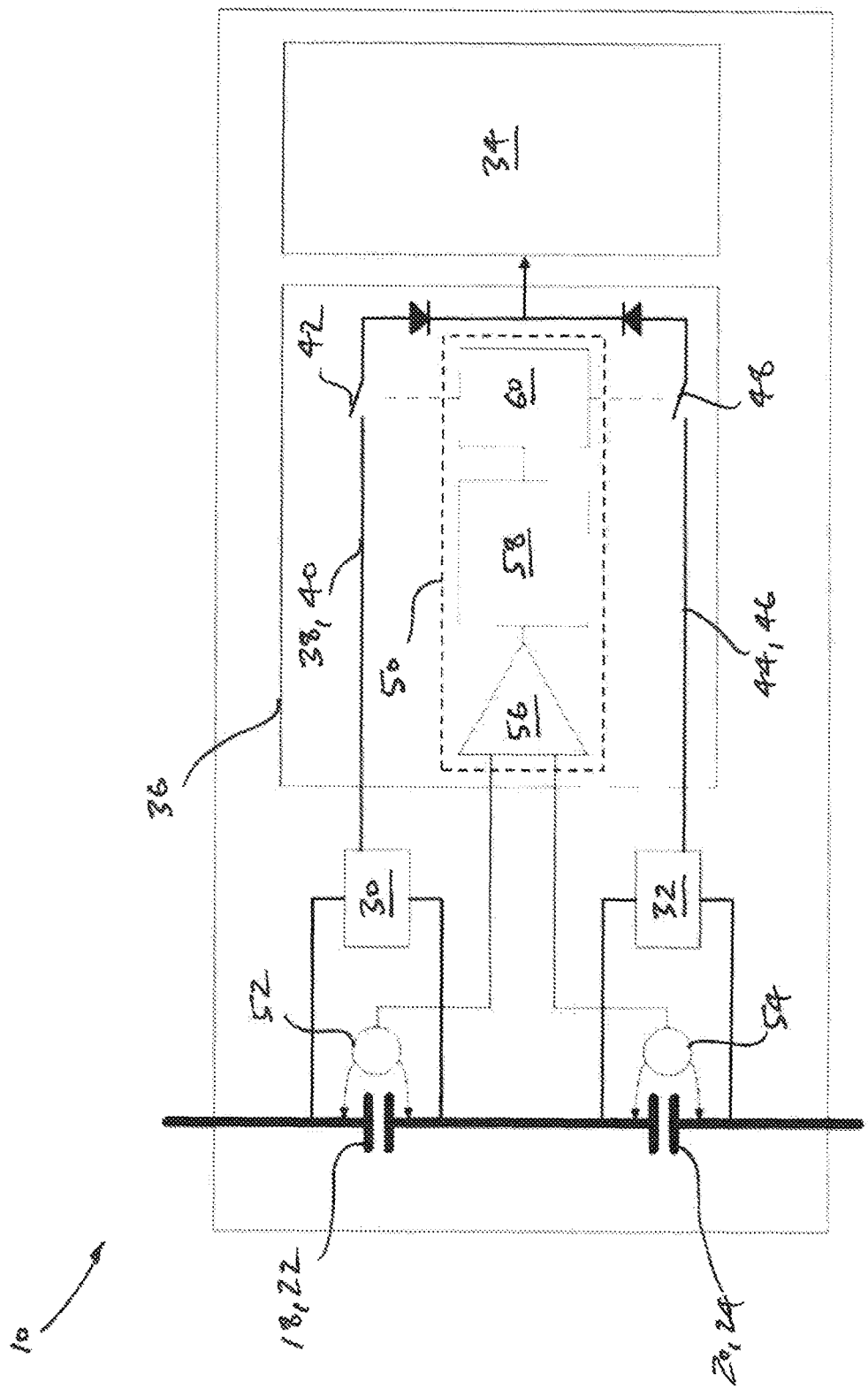
FIG. 2 shows an enlarged portion of FIG. 1 along with other parts of the chain-link module according to the first embodiment of the invention.

Each auxiliary power supply unit 30, 32 is arranged to source energy from the capacitor 22, 24 with which it is connected in order to be able to supply that energy to an auxiliary chain-link module control circuit 34, as shown in FIG. 2. Typically the auxiliary control circuit 34 includes control and protection electronics for the chain-link module 10, although this need not necessarily be the case.

In addition, as also shown in FIG. 2, the first chain-link module 10 includes a modulation controller 36 which is interconnected between each of the first and second auxiliary power supply units 30, 32 and the auxiliary control circuit 34. While the modulation controller 36 in FIG. 2 is shown as being separate from the auxiliary control circuit 34, in other embodiments of the invention (not shown) such a modulation controller may lie within the auxiliary control circuit while still being interconnected between the auxiliary control circuit and each auxiliary power supply unit.

The modulation controller 36 includes a first energy conduit 38 which extends between the first auxiliary power supply unit 30 and the auxiliary control circuit 34.

The first energy conduit 38 is selectively operable in an energy conducting configuration in which energy is able to flow therethrough and a an energy blocking configuration in which energy is prevented from flowing therethrough.

More particularly, in the embodiment shown the first energy conduit 38 is a first electrical conductor 40 that incorporates a first series-connected electrical switch 42, which switches the first electrical conductor 40 between its said energy conducting and energy blocking configurations. Other types of energy conduit, configured to selectively conduct or block energy, are possible, however.

The modulation controller 36 similarly includes a second energy conduit 44, formed by a second electrical conductor 46 and second series-connected electrical switch 48, with the second electrical switch 48 likewise switching the second electrical conductor 46 between energy conducting and energy blocking configurations.

In addition, the modulation controller 36 includes a selector module 50 to determine which energy conduit (38, 44) supplies energy, i.e. from the corresponding auxiliary power supply unit (30, 32), in preference to the other energy conduit (38, 44).

In some embodiments of the invention (not shown) the selector module may determine whether one energy conduit supplies energy in preference to the or each other energy conduit in accordance with a pulse width modulation or resistive control methodology. Such methodology advantageously readily permits a selector module of this nature to vary the proportion of energy supplied by each energy conduit, e.g. in a proportional or on some other relative basis to the amount of energy stored by the corresponding auxiliary power supply unit with which it is connected.

In the embodiment shown, however, the selector module (50) makes such a preference determination by determining whether each of the first and second energy conduits 38, 44 should operate in its energy conducting configuration whereby the corresponding energy conduit 38, 44 supplies energy, or in its energy blocking configuration whereby the corresponding energy conduit 38, 44 does not supply energy, i.e. whether the respective electrical switch 42, 48 in each of the first and second electrical conductors 40, 46 should be closed (i.e. supplying energy) or open (not supplying energy).

Moreover, the selector module 50 is configured to make such a determination, i.e. whether a respective energy conduit 38, 44 should supply energy or not, by comparing a measured energy storage value of one of the energy storage devices 18, 20, i.e. a measured voltage of one of the capacitors 22, 24, with a reference energy storage value, e.g. a reference voltage in the case of energy storage devices 18, 20 in the form of capacitors 22, 24, and arranging the respective energy conduit 38, 44 to supply energy, i.e. arranging the corresponding electrical switch 42, 48 to be closed, if the measured energy storage value is greater than or equal to the reference energy storage value, or arranging the respective energy conduit 38, 44 to not supply energy, i.e. arranging the corresponding electrical switch 42, 48 to be open if the measured energy storage value is less than the reference energy storage value.

In other embodiments of the invention (not shown), the selector module may be configured to only arrange the respective energy conduit to supply energy if the measured energy storage value exceeds the reference energy storage value by a predetermined amount, and/or only to arrange the respective energy conduit to not supply energy if the measured energy storage value falls short of the reference energy storage value by a predetermined amount. One preferred predetermined amount could be between 1% and 5% of the nominal energy storage value of one or other of the energy storage devices 18, 20, i.e. between 1% and 5% of the nominal operating voltage of one or other of the capacitors 22, 24.

Returning to the embodiment shown, the measured energy storage value of the first energy storage device 18 is a first measured voltage 52 across the first capacitor 22, and the measured energy storage value of the second energy storage device 20 is a second measured voltage 54 across the second capacitor 24.

Furthermore, the reference energy storage value for the first energy storage device 18 is the measured energy storage value of the second energy storage device 20, i.e. the second measured voltage 54, and vice versa, i.e. the reference energy storage value for the second energy storage device 20 is the measured energy storage value of the first energy storage device 18, i.e. the first measured voltage 52.

Hence in use of the embodiment shown, the selector module 50 compares the first measured voltage 52 of the first capacitor 22 with the second measured voltage 54 of the second capacitor 24 and arranges the first energy conduit 38, i.e. the first electrical conductor 40, to be closed and thereby supply energy if the first measured voltage 52 is greater than or equal to the second measured voltage 54, or arranges the first electrical conductor 40 to be open and thereby not supply energy if the first measured voltage 52 of the first capacitor 22 is less than the second measured voltage 54 of the second capacitor 24.

Similarly, the selector module 50 compares the second measured voltage 52 of the second capacitor 24 with the first measured voltage 52 of the first capacitor 22 and arranges the second energy conduit 44, i.e. the second electrical conductor 46, to be closed and thereby supply energy if the second measured voltage 54 is greater than or equal to the first measured voltage 52, or arranges the second electrical conductor 46 to be open and thereby not supply energy if the second measured voltage 54 of the second capacitor 24 is less than the first measured voltage 52 of the first capacitor 22.

Accordingly, if the first energy storage device 18, i.e. the first capacitor 22, is storing more energy, i.e. has a higher voltage, than the second energy storage device 20, i.e. the second capacitor 24, then the selector module 50 arranges for the first electrical conductor 40 to be closed (i.e. to remain closed if it is already closed). Meanwhile, because the second energy storage device 20, i.e. the second capacitor 24, is storing less energy, i.e. has a lower voltage, than the first energy storage device 18, i.e. the first capacitor 22, the selector module 50 arranges for the second electrical conductor 46 to be open (i.e. to be opened if it was closed).

In such circumstances only the first energy storage device 18, i.e. the first capacitor 22, remains connected with the auxiliary control circuit 34 and so only the first capacitor 22 supplies energy, via the first auxiliary power supply unit 30, to the auxiliary control circuit 34.

In other words, the first chain-link module 10 of the invention switches from having each of the first and second energy storage devices 18, 20, i.e. the first and second capacitors 22, 24, supply respective amounts of energy (which may or may not be equal to one another) to the auxiliary control circuit 34 (via the respective first and second auxiliary power supply units 30, 32), i.e. supply respective proportions of energy to the auxiliary control circuit 34, to having the first capacitor 22 supply all of the energy needed by the auxiliary control circuit 34 and the second capacitor 24 supplying no energy to the auxiliary control circuit 34, i.e. supply different respective proportions of energy to the auxiliary control circuit 34.

In this manner the modulation controller 36, of which the selector module 50 is a part, is configured to modulate the proportion of energy supplied to the auxiliary control circuit 34 from each of the first and second energy storage devices 18, 20, i.e. the first and second capacitors 22, 24, via the corresponding first and second auxiliary power supply units 30, 32, and more particularly to determine which energy conduit, e.g. the first energy conduit 38, supplies energy in preference to the other energy conduit, e.g. the second energy conduit 44.

As a consequence of the foregoing, the energy stored, i.e. the voltage, of the first capacitor 22 is depleted, such that the amount of energy stored by the first capacitor 22 moves closer to the lower amount of energy stored by the second energy storage device 20, i.e. the second capacitor 24.

Additionally, in the embodiment shown, the selector module 50 is configured to carry out the aforementioned determination of which of the first and second energy conduits 38, 44, i.e. which of the first and second electrical conductors 40, 46, should supply energy or not in preference to the other, only if the difference between the measured energy storage values of the first and second energy storage devices 18, 20, i.e. only if the difference between the first and second measured voltages 52, 54 of the first and second capacitors 22, 24, exceeds a predetermined threshold. An example of such a threshold may be between 1% and 5% of the nominal energy storage value of one or other of the energy storage devices 18, 20, i.e. between 1% and 5% of the nominal operating voltage of one or other of the capacitors 22, 24.

The selector module 50 is so configured by including a difference module 56 to establish the difference between the first and second measured voltages 52, 54, and a comparator module 58 to compare the established difference with the predetermined threshold.

Other embodiments of the invention (not shown) may include a selector module which is configured to determine whether or not a respective energy conduit is to supply energy, only in reliance on the difference, if any, between the measured energy storage values of the first and second energy storage devices, or if such a difference exceeds a predetermined threshold, without any recourse to any reference to or comparison with a reference energy storage value.

In preferred embodiments of the invention in which one or more chain-link modules have first and second series-connected energy storage devices, e.g. first and second series-connected capacitors, a mid-point between the first and second energy storage devices may be connected to a chassis of such a chain-link module to establish a reference potential of the chain link module.

The energy stored in such energy storage devices may then be based on a voltage measurement relative to such a reference potential, which means that electrical isolation is not necessary and the voltage rating of the measurement circuit can be minimised.

Utilising such a mid-point as the reference potential for a chain-link module also facilitates the design of the auxiliary power supply units and the auxiliary chain-link module control circuit as the maximum potential difference applied between such circuit elements is minimised.

In turn, this helps to ensure that insulation requirements of the chain-link module are minimised. It also means that the respective inputs and outputs of each associated auxiliary power supply unit can share the same common mid-point reference potential.

Furthermore, use of such a mid-point reference potential allows each auxiliary power supply unit to comprise a single circuit in which current can flow between the input and output, i.e. the input and output do not need to be electrically isolated from one another. Such power supply units are less costly and complex than, e.g. isolating power converters which might otherwise have to be used.

Returning to the embodiment shown, the selector module 50 still further includes a switching module 60 to affect switching of the first and second electrical switches 42, 48 in order to transform the corresponding first and second electrical conductors 40, 46 between their respective energy conducting and energy blocking configurations.

Also, in preferred embodiments of the invention the total energy stored by the plurality of energy storage devices combined, e.g. the first and second energy devices 18, 20, combined in the first example embodiment shown, is controlled independently of operation of the modulation controller, e.g. by a controller (not shown) remote from the modulation controller 36, or indeed remote from the chain-link module 10 itself.

We claim:

1. A chain-link module, for connection in series with other chain-link modules to form a chain-link converter selectively operable to provide a stepped variable voltage source within a voltage source converter, the chain-link module comprising:

at least one pair of series-connected switching elements connected in parallel with a plurality of series-connected energy storage devices, each energy storage device having an auxiliary power supply unit connected in parallel therewith to source energy therefrom for supply to an auxiliary chain-link module control circuit; and a modulation controller interconnected between each auxiliary power supply unit and the auxiliary chain-link module control circuit, the modulation controller being configured to modulate a proportion of energy supplied to the auxiliary chain-link module control circuit by each auxiliary power supply unit;

wherein the modulation controller comprises a respective energy conduit extending between each auxiliary power supply unit and the auxiliary chain-link module control circuit, and a selector module to determine which energy conduit supplies energy from the corresponding auxiliary power supply unit in preference to each other energy conduit.

2. The chain-link module according to claim 1, wherein each energy conduit is selectively operable in an energy conducting configuration in which energy is able to flow therethrough and an energy blocking configuration in which energy is prevented from flowing therethrough.

3. The chain-link module according to claim 2, wherein each energy conduit is or includes an electrical conductor incorporating a series-connected electrical switch to switch the respective electrical conductor between energy conducting and energy blocking configurations.

4. The chain-link module according to claim 1, wherein the selector module is configured to vary the proportion of energy supplied by each energy conduit.

5. The chain-link module according to claim 1, wherein the selector module is configured to determine whether a respective energy conduit is to supply energy or not by comparing a measured energy storage value of the corresponding energy storage device with a reference energy storage value and arranging the respective energy conduit to be supply energy if the measured energy storage value is greater than or equal to the reference energy storage value or to not supply energy if the measured energy storage value is less than the reference energy storage value.

6. The chain-link module according to claim 5, wherein the selector module is configured to one or more of arrange the respective energy conduit to supply energy if the measured energy storage value exceeds the reference energy storage value by more than a predetermined amount and arrange the respective energy conduit to not supply energy if the measured energy storage value falls short of the reference energy storage value by more than a predetermined amount.

7. The chain-link module according to claim 5, wherein the reference energy storage value is a measured energy storage value of another energy storage device.

8. The chain-link module according to claim 1, having first and second series-connected energy storage devices wherein the selector module is configured to determine whether a respective energy conduit is to supply energy or not if the difference between measured energy storage values of the first and second energy storage devices exceeds a predetermined threshold.

9. The chain-link module according to claim 1, wherein the total energy stored by the plurality of energy storage devices combined is controlled independently of operation of the modulation controller.

10. The voltage source converter comprising at least one chain-link converter having a plurality of series-connected chain-link modules, at least one of said chain-link modules being a chain-link module according to claim 1.

\* \* \* \* \*